United States Patent Office 3,586,677
Patented June 22, 1971

3,586,677
DYESTUFFS FROM NAPHTHOYLENE-
BENZIMIDAZOLIUMS
Robert Frederic Michel Sureau, Enghien-les Bains, and
Marie-Josephe Jeanne Alicot, Soisy-sous-Montmorency,
France, assignors to Ugine Kuhlmann, Paris, France
No Drawing. Filed Jan. 17, 1967, Ser. No. 609,757
Claims priority, application France, Jan. 24, 1966,
46,932
Int. Cl. C07d 87/42
U.S. Cl. 260—247.2           3 Claims

ABSTRACT OF THE DISCLOSURE

The present invention relates to cationic dyestuffs derived from naphthoylene-benzimidazolium compounds, to the preparation of the dyestuffs, to their use in the coloration of polymers or copolymers of acrylonitrile which they dye in fast shades, and to the colored polymers or copolymers.

The present invention concerns new cationic dyestuffs and their applications to dyeing. It relates particularly to new cationic dyestuffs derived from naphthoylene-benzimidazolium compounds, which may be represented by the following general formula:

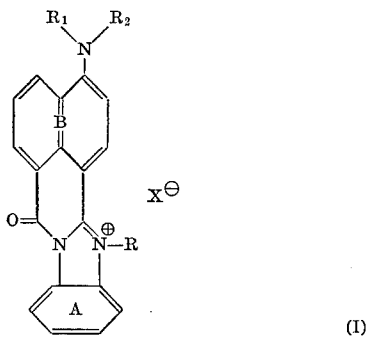

(I)

in which A and B may be substituted by halogen atoms or alkyl, alkoxy, nitro, cyano, trifluoromethyl, alkylsulphonyl or sulphonamido groups, R represents an alkyl or aralkyl group, $R_1$ and $R_2$ represent hydrogen atoms or alkyl, aryl, aralkyl, or cyclo-alkyl groups possibly substituted, for example, by halogen atoms, or alkyl, alkoxy, phenoxy, hydroxy, cyano, trifluoromethyl, amino, acylamino, alkylamino, dialkylamino, phenylamino, alkylphenylamino or aralkylamino groups, and $R_1$ and $R_2$ may together with the nitrogen atom to which they are linked also form a heterocyclic nucleus such as for example the piperidine or morpholine nucleus, and X represents a monovalent anion.

It has been found that the dyestuffs according to the invention may be obtained very generally by reacting an amine of the formula

(II)

with a dyestuff of Formula III, in which $R_3$ represents a chlorine or bromine atom:

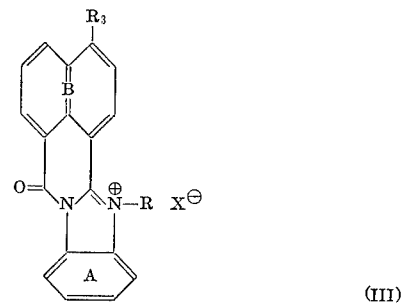

(III)

In Formulae II and III, R, $R_1$, $R_2$ and X have the same significance as in Formula I and in Formula III A and B may be substituted as in Formula I.

The reaction may be carried out for example in the presence of an excess of the base of Formula II, which serves to neutralise the liberated acid, without the addition of solvent or in an aqueous medium to which may be added a solvent which is miscible with water such as alcohol, acetone or dimethyl formamide. The excess of the base may also be replaced by a weak alkaline substance such as an alkaline carbonate, bicarbonate or acetate. Finally, it may be advantageous in the case of ammonia and aliphatic or cycloaliphatic bases to replace the free bases in the reaction by their salts of weak acids, for example carbonates or acetates. The reaction is often very rapid and may start at the ambient temperature although it may be advantageous to operate at a higher temperature.

The dyestuffs of Formula III may be obtained, for example, by treating derivatives of the formula:

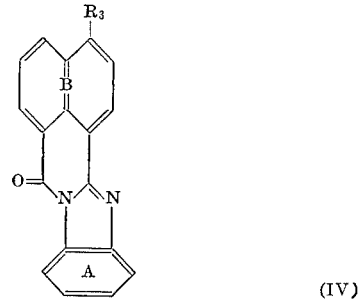

(IV)

in which the possible substituents of the nuclei A and B and the meaning of $R_3$ are the same as above, with alkylating or aralkylating agents, possibly in the presence of an organic solvent, at temperatures between 80° C. and 180° C. The agents most used are the alkyl or aralkyl halides, sulphates and arylsulphonates. Solvents which can be used are, for example, alcohols, chloroform, dichloroethane, benzene hydrocarbons and their chlorinated derivatives, or dimethyl formamide.

The dyestuffs of Formula I are generally very soluble in hot water and display the general characteristics of cationic dyestuffs. In particular, they are found to be useful for dyeing fibres based on polymers or copolymers of acrylonitrile, to which they give rich and fast shades often of great brilliancy. The range of shades extends from yellow to violet blue, passing through the intermediate shades.

In the following examples, illustrative of this inventive concept, the parts are parts by weight unless the contrary is stated.

EXAMPLE 1

2.15 parts of N-methyl-bromonaphtholyene-methoxy-benzimidazolium chloride are heated with 3 parts of aniline for about an hour on a boiling water-bath. The colour of the mixture changes very quickly from yellow to red. After cooling, water and hydrochloric acid are added until the mixture is acid to Congo red, the precipitated dyestuff is filtered off and dried under vacuum.

The dyestuff thus obtained dyes acrylic fibres a particularly bright bluish red shade possessing very good general fastness.

EXAMPLE 2

2.15 parts of the same benzimidazolium chloride are heated with 1.9 parts of 4-amino-diphenylamine and 30 parts of ethyl alcohol for about an hour under reflux. After cooling, the product is diluted with water containing hydrochloric acid, and the precipitate is filtered off, drained and dried. 2.5 parts of a deep blue powder are obtained which dyes acrylic fibres a violet blue shade which is very fast, especially to light.

EXAMPLES 3–4

On replacing the 4-amino-diphenylamine in the preceding example by 1.1 parts of p-toluidine and 1.25 parts of p-anisidine respectively, under the same conditions two dyestuffs are obtained which dye acrylic fibres in very fast ruby and red violet shades respectively.

EXAMPLE 5

2.2 parts of N-methyl-4-bromo-naphthoylene-chloro-benzimidazolium chloride are heated in 50 parts of water and 1 part of aniline for half an hour at 90–95° C. with stirring. The product is made acid to Congo red paper by the addition of hydrochloric acid, cooled and the crystalline red dyestuff is filtered off. It dyes polyacrylic fibers a bright red which is less bluish than the dyestuff described in Example 1; this shade has very good general fastness.

EXAMPLE 6

On replacing the aniline in Example 5 with 1.1 parts of cyclohexylamine and also adding 1 part of acetic acid, under the same conditions a dyestuff is obtained which dyes acrylic fibres a bright and fast greenish yellow shade.

EXAMPLE 7

On replacing the aniline of Example 5 with 2 parts of ammonium acetate, under the same operating conditions a golden yellow dyestuff, crystallised in fine leaflets, is obtained which dyes acrylic fibres a bright green yellow shade.

EXAMPLE 8

5.3 parts of 4,5-dichloro-1,8-naphthalic anhydride, 4.2 parts of 4-methoxy-1,2-diamino-benzene sulphate and 2.5 parts of anhydrous sodium acetate in 100 parts of acetic acid are heated under reflux for 2 hours. The product is allowed to cool and the orange crystalline precipitate of dichloro-naphthoylene-methoxybenzimidazole is filtered off, washed with acetic acid and then dried at 100° C. Dry weight obtained, 4.8 parts.

A mixture comprising 10 parts of this compound and 50 parts of methyl sulphate is heated for a minute at 180° C. The solution obtained is cooled to below 100° C. and 250 parts of water are added. The mixture is boiled until a clear golden yellow solution is obtained. On cooling, N-methyl-dichloro-naphthoylene-methoxybenzimidazolium methylsulphate is precipitated in the form of orange yellow plates, which are filtered off, drained and dried at 50° C.

5 parts of this salt are dissolved in 50 parts of boiling water and a solution of 2.5 parts of p-anisidine in 25 parts of ethyl alcohol is added and the mixture is refluxed. A rapid change of colour of the solution to violet is observed. After boiling for 15 minutes, concentrated hydrochloric acid is added until the mixture is acid to Congo red, then it is cooled and the precipitate obtained is filtered off. This dyes acrylic fibres a violet shade endowed with excellent general properties.

If in this example p-anisidine is replaced by aniline or morpholine, dyestuffs dyeing acrylic fibres in bright bluish red and bright red shades respectively are obtained.

The following table describes a number of dyestuffs of Formula I obtained by reacting, according to processes analogous to those above, the amines defined below with compounds of Formula III in which the nucleus A may be substituted as indicated in column A.

| Ex. | H–N(R_1)(R_2) | A | Shades on acrylic fibers |
|---|---|---|---|
| 9 | o-Chloraniline | OCH$_3$—4(—5) | Bright golden yellow. |
| 10 | m-Chloraniline | Same as above | Bright orange. |
| 11 | p-Chloraniline | do | Bright red. |
| 12 | o-Toluidine | do | Orange. |
| 13 | m-Toluidine | do | Bright bluish red. |
| 14 | o-Anisidine | do | Brownish red. |
| 15 | m-Anisidine | do | Bright red. |
| 16 | p-Cresidine | do | Bordeaux. |
| 17 | 3-trifluoromethyl-aniline | do | Bright vermilion. |
| 18 | N-methylaniline | do | Yellow brown. |
| 19 | 4-acetylamino-aniline | do | Bordeaux. |
| 20 | p-Phenylenediamine | do | Red violet. |
| 21 | 4-diethylamino-aniline | do | Brownish violet. |
| 22 | 2,5-dimethyl-aniline | do | Scarlet. |
| 23 | 2,4-dimethyl-aniline | do | Yellow. |
| 24 | 4-phenoxy-aniline | do | Bright ruby. |
| 25 | 4-cyanoaniline | do | Orange gold. |
| 26 | Mesidine | do | Coral. |
| 27 | Monomethylamine | do | Golden yellow. |
| 28 | Monoethylamine | do | Do. |
| 29 | Diethylamine | do | Bright green yellow. |
| 30 | Monoethanolamine | do | Golden yellow. |
| 31 | Diethanolamine | do | Yellow. |
| 32 | Ethylethanolamine | do | Do. |
| 33 | Methoxypropylamine | do | Golden yellow. |
| 34 | 2-diethyl-hexylamine | do | Greenish yellow. |
| 35 | Morpholine | do | Bright vermilion. |
| 36 | Piperidine | do | Yellow. |
| 37 | Aniline | Any | Bright scarlet. |
| 38 | m-Chloraniline | Any | Bright salmon. |
| 39 | p-Chloraniline | Any | Bright scarlet. |
| 40 | o-Toluidine | Any | Salmon. |
| 41 | m-Toluidine | Any | Bluish red. |
| 42 | p-Toluidine | Any | Do. |
| 43 | o-Anisidine | Any | Red. |
| 44 | m-Anisidine | Any | Bluish red. |
| 45 | p-Anisidine | Any | Purplish red. |
| 46 | p-Cresidine | Any | Bordeaux. |
| 47 | 3-trifluoromethyl-aniline | Any | Bright vermilion. |
| 48 | 4-acetylamino-aniline | Any | Bordeaux. |
| 49 | p-Phenylenediamine | Any | Red violet. |
| 50 | p-Aminodiphenylamine | Any | Violet blue. |
| 51 | 4-phenoxy-aniline | Any | Ruby. |
| 52 | Monoethylamine | Any | Bright green yellow |
| 53 | Diethylamine | Any | Do. |
| 54 | Monoethanolamine | Any | Yellow. |
| 55 | Diethanolamine | Any | Do. |
| 56 | Morpholine | Any | Bright vermillion |
| 57 | p-Morpholinoaniline | Any | Violet. |
| 58 | Piperidine | Any | Yellow. |
| 59 | Cyclohexylamine | Any | Do. |
| 60 | Aniline | CH$_3$—4(—5) | Bright red. |
| 61 | O-Chloraniline | Same as above | Golden yellow. |
| 62 | m-Chloraniline | do | Bright red. |
| 63 | p-Chloraniline | do | Bright bluish red. |
| 64 | o-Toluidine | do | Orange. |
| 65 | m-Toluidine | do | Bright bluish red. |
| 66 | p-Toluidine | o | Do. |
| 67 | o-Anisidine | do | Bordeaux. |
| 68 | m-Anisidine | do | Bright bluish red. |
| 69 | p-Anisidine | do | Red violet. |
| 70 | p-Cresidine | dp | Bordeaux. |
| 71 | 3-trifluoromethylaniline | do | Bright vermilion. |
| 72 | 4-acetylamino-aniline | do | Red violet. |
| 73 | p-Phenylenediamine | do | Violet. |
| 74 | p-Aminodiphenylamine | do | Violet blue. |
| 75 | 4-Phenoxy-aniline | do | Bright ruby. |
| 76 | 4-Cyano aniline | do | Vermilion. |
| 77 | Monoethylamine | do | Yellow. |
| 78 | Diethylamine | do | Do. |
| 79 | Monoethanolamine | do | Green yellow. |
| 80 | Diethanolamine | do | Do. |
| 81 | Cyclohexylamine | do | Greenish yellow. |
| 82 | Morpholine | do | Bright vermilion. |
| 83 | Piperidine | do | Yellow. |
| 84 | Aniline | Cl—4(—5) | Bright red. |

| Ex. | H—N(R₁)(R₂) R₂ | A | Shades on acrylic fibers |
|---|---|---|---|
| 85 | o-Chloraniline | Same as above | Bright orange. |
| 86 | m-Chloraniline | do | Bright red. |
| 87 | p-Chloraniline | do | Do. |
| 88 | o-Toluidine | do | Vermilion. |
| 89 | m-Toluidine | do | Bright ruby. |
| 90 | p-Toluidine | do | Brodeaux. |
| 91 | o-Anisidine | do | Bluish red. |
| 92 | m-Anisidine | do | Bright ruby. |
| 93 | p-Anisidine | do | Red violet. |
| 94 | p-Cresidine | do | Bordeaux. |
| 95 | 3-trifluoromethylaniline | do | Bright red. |
| 96 | N-methylaniline | do | Purplish red. |
| 97 | 4-Acetylamino-aniline | do | Red violet. |
| 98 | p-Phenylenediamine | do | Violet. |
| 99 | 4-Diethylamino-aniline | do | Dull violet. |
| 100 | p-Aminodiphenylamine | do | Blue violet. |
| 101 | 4-phenoxy-aniline | do | Bright ruby. |
| 102 | 4-cyano-aniline | do | Scarlet. |
| 103 | p-Xylidine | do | Do. |
| 104 | m-Xylidine | do | Orange gold. |
| 105 | Mesidine | do | Orange. |
| 106 | Monoethylamine | do | Bright green yellow. |
| 107 | Diethylamine | do | Do. |
| 108 | Morpholine | do | Orange. |
| 109 | Cyclohexylamine | do | Greenish yellow. |
| 110 | Piperidine | do | Do. |
| 111 | Aniline | CN—4(—5) | Bright ruby. |
| 112 | p-Chloraniline | Same as above | Do. |

We claim:

1. A dyestuff of the formula:

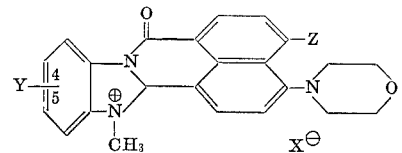

in which Y is in the 4 or 5 position and is selected from hydrogen, chlorine, methyl, methoxy and cyano; Z is selected from hydrogen and chlorine and $X^{\ominus}$ is a monovalent anion.

2. A dyestuff in accordance with claim 1 wherein said monovalent anion is chlorine.

3. A dyestuff in accordance with claim 1 wherein Y is methyl.

References Cited

Wagner et al.: Synthetic Organic Chemistry, N.Y., Wiley & Sons, 1953, (pp. 667–670 relied on).

ALEX MAZEL, Primary Examiner

A. M. T. TIGHE, Assistant Examiner

U.S. Cl. X.R.

8—177; 260—282